United States Patent

Prevost et al.

(10) Patent No.: US 6,384,829 B1
(45) Date of Patent: May 7, 2002

(54) STREAMLINED ARCHITECTURE FOR EMBODIED CONVERSATIONAL CHARACTERS WITH REDUCED MESSAGE TRAFFIC

(75) Inventors: Scott A. Prevost, San Francisco; Linda K. Cook, Sacramento; Peter Hodgson, San Francisco, all of CA (US)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/447,932

(22) Filed: Nov. 24, 1999

(51) Int. Cl.[7] .................................................. G06T 15/00

(52) U.S. Cl. .............................. 345/473; 345/474

(58) Field of Search ........................ 345/418, 473, 345/474, 475

(56) References Cited

U.S. PATENT DOCUMENTS

| | | | |
|---|---|---|---|
| 6,040,841 A | * | 3/2000 | Cohen et al. ............... 345/473 |
| 6,111,590 A | * | 8/2000 | Boezeman et al. ......... 345/474 |
| 6,118,460 A | * | 9/2000 | Uwakubo .................... 345/474 |

OTHER PUBLICATIONS

Badler, et al., *Simulating Humans: Computer Graphics Animation and Control*, Oxford University Press, 1993 (Out Of Stock—Unavailable).

Barsky, et al., *Making Them Move: Mechanics, Control, and Animation of Articulated Figures*, Morgan Kaufmann Publishers, San Mateo, 1991 (Copy Not Provided).

Bates, et al., *Integrating Reactivity, Goals and Emotion in a Broad Agent*, Proceedings of the 14th Annual Conference of the Cognitive Science Society, Indiana, Jul. 1992, pp. 696–701.

Blumberg, et al., *Multi–Level Direction of Autonomous Creatures for Real–Time Virtual Environments*, Computer Graphics (SIGGRAPH '95 Proceedings), 1995, 30(3):47–54.

Brooks, *A Robust Layered Control System For A Mobile Robot*, IEEE Journal of Robotics and Automation, vol. RA–2, No. 1, Mar. 1986, 2(1):14–23.

Bruderlin, et al., *Motion Signal Processing*, Computer Graphics (SIGGRAPH '95 Proceedings), 1995, 30(3):97–104.

Chadwick, et al., *Layered Construction for Deformable Animated Characters*, Computer Graphics (SIGGRAPH '89 Proceedings), 1989, 23(3):243–252.

Ebert, et al., *Texturing and Modeling, A Procedural Approach*, Academic Press, London 1994 (Out Of Print).

Girard, et al., *Computational Modeling for the Computer Animation of Legged Figures*, Computer Graphics (SIGGRAPH '85 Proceedings), 1985, 19(3):263–270.

(List continued on next page.)

Primary Examiner—Cliff N. Vo
(74) Attorney, Agent, or Firm—Fliesler, Dubb, Meyer & Lovejoy LLP (57) ABSTRACT

An architecture including a speech manager that identifies input, input content, and location of the input (speech, for example), a action scheduler, a dialog manager, and an animation system provides reduced message traffic and streamlined processing for support of animated characters (conversational characters, for example). Speech recognition is provided along with location information to the action scheduler for determination of appropriate expressions for interactive behavior (looking, turn taking, etc.), and speech (or input) content is provided to a dialog manager to determine a substantive response (including speech or other content related responses) and any facial expressions or gestures related to content, but not containing content, are identified, and placed in a communication to the animation system.

27 Claims, 8 Drawing Sheets

OTHER PUBLICATIONS

Hodgins, et al., *Animating Human Athletics,* Computer Graphics (SIGGRAPH '95 Proceedings), 1995, 30(3):71–78.

Johnson, et al., WavesWorld: PhD Thesis, *A Testbed for Constructing Three Dimensional Semi–Automonous Animated Characters,* MIT, 1995, pp. 1–171.

Maes, et al., *The Alive System: Full–Body Interaction with Autonomous Agents* in Computer Animation '95 Conference, Switzerland, 1995, IEEE Press, pp 11–18.

Minsky, *Society of Mind,* MIT press 1986 (Copy Not Provided).

Morawetz, et al., *Good–Directed Human Animation of Multiple Movements,* Proc. Graphics Interface, 1990, pp 60–67 (Out of Print).

Perlin, *An Image Synthesizer,* Computer Graphics (SIGGRAPH '85 Proceedings), 1985, 19(3):287–296.

Perlin, *Danse Interactif, SIGGRAPH '94* Electronic Theater, Orlando (Video–Taped Oral Presentation).

Perlin, *Real Time Responsive Animation With Personality,* IEEE Transactions on Visualization and Computer Graphics, 1995 1(1), pp 5–15.

Perlin, *Improv: A System for Scripting Interactive Actors in Virtual Worlds,* Technical Report NYU Department of Computer Science, 1996.

Sims, *Evolving Virtual Creatures,* Computer Graphics (SIGGRAPH '94 Proceedings), 1994, 28(3):15–22.

Stephenson, *Snow Crash,* Bantam Doubleday, New York, 1992 (Out Of Stock—Unavailable).

Strassman, *DesktopTheater: Automatic Generation of Expressive Animation,* PhD Thesis, MIT Medial Lab, 1991.

Terzopoulos, et al., *Artificial Fishes: Autonomous Locomotion: Perception, Behavior, and Learning in a Simulated Physical World,* Artificial Life IV, 1994, 1(4):327–351.

Witkin, et al., *Motion Warping,* Computer Graphics (SIGGRAPH '95 Proceedings) 1995, 30(3):105–108.

* cited by examiner

Synthetic Character Hierarchy

Dialogue Manager

STREAMLINED ARCHITECTURE FOR EMBODIED CONVERSATIONAL CHARACTERS WITH REDUCED MESSAGE TRAFFIC

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates to the display of animated objects and characters. The invention is also related to the architecture, related components, and communications between each module or component of the architecture. The invention is more particularly related to an architecture that reduces an amount of message communications needed between the modules and components of the conversational character.

2. Discussion of Background

Figure 1:
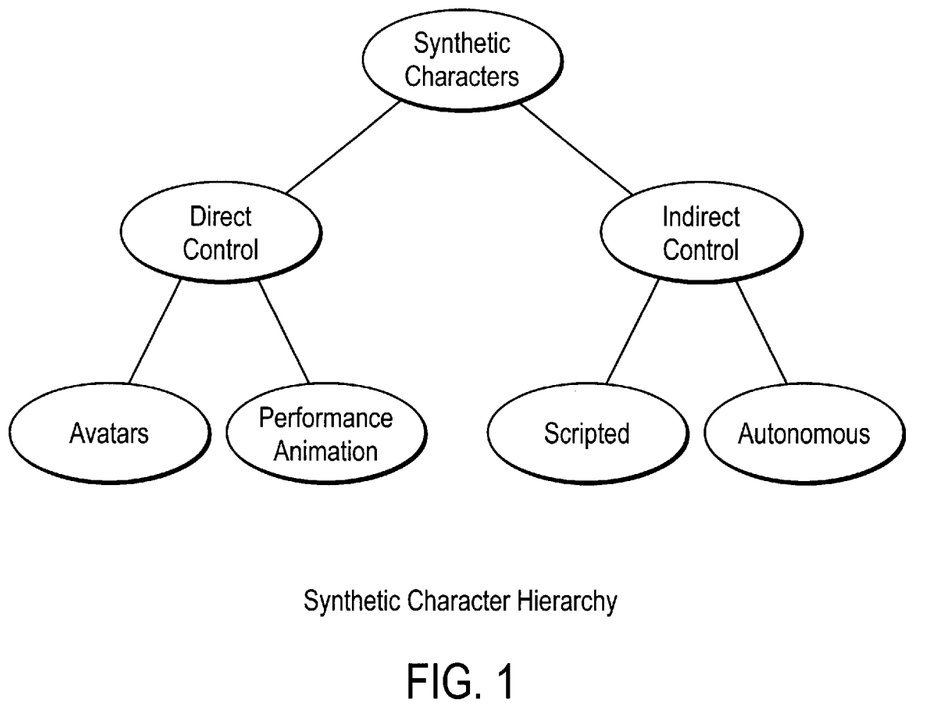
FIG. 1 is a taxonomy of synthetic character types.

Synthetic, animated characters can be divided into two broad categories: characters that are directly controlled by a human user's actions, and characters that perform behaviors, independent of the user's actions, either autonomously or through pre-compiled scripts. A taxonomy of synthetic character types is illustrated in FIG. 1.

Characters controlled by a user's actions are often called an "avatar" and generally serve as a representation in a virtual environment of the user who controls its behavior. These avatar characters are used in graphical chat-rooms and on-line virtual worlds such as Habitat, the Palace, BodyChat [Vilhjalmsson97], Oz Virtual, OnLive! Technologies and Worlds, Inc.

Due to the computational complexity of real-time interactions in graphical virtual environments, avatar representations tend to be graphically simplistic and insufficient for representing spontaneous gestures, facial expressions, and other non-verbal behaviors. Moreover, because the input modalities are severely restricted in online virtual worlds, generally confined to the mouse and keyboard, avatar users are forced to exercise fine-grained, conscious control over each gestural movement.

Vilhjalmsson's BodyChat system attempts to overcome this difficulty by integrating a model of awareness and turn-taking behaviors into its avatars. For example, giving the avatars some autonomy to make decisions about where to look based on user defined parameters for conversational engagement.

Another use of directly controlled characters is for automatically generating animations based on the movements of human actors. By correlating points on an actor's body with nodes in the graphical representation of the character, this "performance animation" technique imbues the character with the ability to produce fine-grained gestures and facial expressions, and exhibit realistic gaze behaviors and body movements.

Characters that are not directly controlled by the user can be subdivided into two groups: those whose behaviors are scripted in advance, and those whose behaviors are essentially autonomous, and derived at runtime based on inputs from the user. The range of behaviors of the former type of character must be explicitly defined by the character's creator. One advantage of pre-scripting is that the integration of verbal and non-verbal behaviors need not be calculated at runtime, thereby avoiding complicated on-the-fly planning of motor controls in the animation model.

Scripted characters, on the other hand, are limited in their ability to interact with users and react to multimodal user inputs. Examples of scripted character systems include:

Document Avatars [Bickmore97]. These characters are attached to hypertext documents, and can be scripted to perform specific behaviors when certain parts of the document (e.g. links) are selected. Document avatars can be used to provide guided tours of a document, representing a particular reader's viewpoint. They can be scripted to speak, move around the document, point to objects and activate links.

Microsoft Agent [Microsoft97]. These characters can be scripted to speak a text string, perform specific animation sequences, hide, move and resize. The user interacts with a character by dragging it or selecting commands from a pop-up menu.

Jack Presenter [Badler97]. This system allows an anthropomorphically correct 3D animated figure to be scripted to give a presentation. The character's author provides the narrative text which includes annotations describing where, when and what type of gestures should occur. Users simply observe the character's pre-determined behaviors.

PPP Persona [Andre96]. This project uses a planning system to plan tutorials of specified material given a target time duration for the presentation. Presentations are not scripted by human authors, but are instead created by a planning system. Unlike Document Avatars and Microsoft Agent characters, users cannot interact with the characters during a presentation.

The second group of indirectly controlled characters are the autonomous (or semi-autonomous) characters. Work in this area can be further divided into two categories: entertainment/simulation characters, and task-based characters. The former category includes non-human character representations (e.g. The MIT Media Laboratory's ALIVE system [Maes94], PF Magic's Dogz, Fujitsu Interactive's Fin Fin, and CMU's Oz) as well as systems for authoring anthropomorphic virtual actors (the NYU Media Research Laboratory's Improv system [Perlin96], and Stanford's Virtual Theater Project).

Prior task-based autonomous characters include the following systems:

Microsoft Office Characters The MS Office suite of applications includes a collection of animated characters to provide user assistance and an interface to the online documentation. These characters can respond to typed, free-form questions, and respond with text balloons containing mouse-clickable menu options.

Microsoft Persona [Microsoft97] The Persona project allows a user to control a computerized jukebox through an animated character who accepts speech input and produces spoken output with limited spontaneous gestures.

Animated Conversation [Cassell94] In this system, two animated characters, Gilbert and George, can converse with one another, using context-appropriate speech, gestures and facial expressions, to negotiate banking transactions in a virtual bank.

Ymir [Thorisson96] Ymir is an architecture for autonomous characters that display turn-taking and other interactional competencies. The user interacts with Gandalf, an animated character developed in the Ymir architecture, using natural speech and gestures to ask questions about the solar system. Of the prior art cited above, only the Gandalf/Ymir system utilizes some natural non-verbal inputs such as gesture and head position.

Systems having user interfaces based on social rules of engagement, rather than physical tools (such as a desktop or other metaphor) are discussed in Prevost et al., entitled "Method and Apparatus for Embodied conversational Characters with Multimodal I/O in an Interface Device", U.S. patent application Ser. No. 09/223,637, XERXF 1017 MCF/JWC, which is incorporated herein by reference, in its entirety.

Prevost et al. also proposes an architecture for conversational characters, that, in at least one embodiment includes various modules or components that communicate via messages. The proposed architecture provides a framework in which a conversational character may perform the processing needed to interact with a human user.

However, in each prior art system for conversational characters, either the architecture itself is insufficient (without reactive and deliberative processing, for example), or includes a large amount of processing and message passing.

SUMMARY OF THE INVENTION

The present inventors have realized that a large amount of message passing, even when encapsulated in a cognitively correct architecture (the way people actually process information in dialog), can be too cumbersome or have too slow a processing time to make animations work as seamlessly as is desired by a human interacting with the animation. The present invention provides a streamlined architecture with reduced message passing that effectively allows all pertinent processing functions (including reactive and deliberative processing), along with I/O functions to be performed faster than previous conversational character architectures and systems.

The present invention includes a speech manager that effectively coordinates inputs to a conversational character (including speech recognition and vision data), an Action/Reaction scheduler having rules for expression of interactive behavior, a dialog manger for determining responses including speech content and other facial expressions and gestures that necessarily need to be included with content, and an animation system that implements content and reactions determined by the Action/Reaction and Dialog manager modules.

The present invention may be embodied in an apparatus for implementing an autonomous animated character, comprising an animation system configured to control said animated character based on commands, an action scheduler configured to, receive inputs related to at least one of said animated character and a user of said animated character, and send commands based on said inputs to said animation system to control said animated character, a vision mechanism configured to send a location of said user to said action scheduler as one part of said inputs, a dialogue manager configured to, receive speech input records and determine speech, actions, and gesture responses to be performed by said animated character, and provide said speech, actions, and gesture responses to said action scheduler as a second part of said inputs, and a speech manager configured to, receive speech inputs from said user, prepare and send a speech on message to said action scheduler indicating speech inputs are being received, and convert the received speech to a speech input record and send the speech input record to said dialogue manager.

The invention includes a method of controlling an animated character, comprising the steps of, identifying occurrence of an input to said animated character, preparing a lightweight record identifying said input occurrence, transferring said lightweight record to a action scheduler, preparing a reactive response for said animated character in response to the input occurrence identified in said lightweight record, and transferring said reactive response to an animation system that controls said animated character, and playing said reactive response by said animation system. Alternatively, the invention may be implemented across networked computers, including a method having the steps of receiving an animated character request at a host computer from a remote computer, uploading an animation system and a speech manager from said host computer to said remote computer, receiving lightweight and content records from said speech manager on said remote computer, preparing fast and detailed responses based on said lightweight and content records, and uploading said fast and detailed responses to said animation system on said remote computer.

Each of the methods and processes of the invention may be embodied as a set of computer readable instructions, that, when loaded into the computer cause the computer to perform the method and/or processes of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

LIST OF TABLES

Table 1 is an example of a speech on/off records;

Table 2 is an example of recognition coordinate records;

Table 3 is an example of content records;

Table 4 is an example of a packet of content and content related gestures and facial expressions; and Table 5 is an example of packets containing reaction type movements (non-speech related).

DESCRIPTION OF THE PREFERRED EMBODIMENTS

Figure 2:
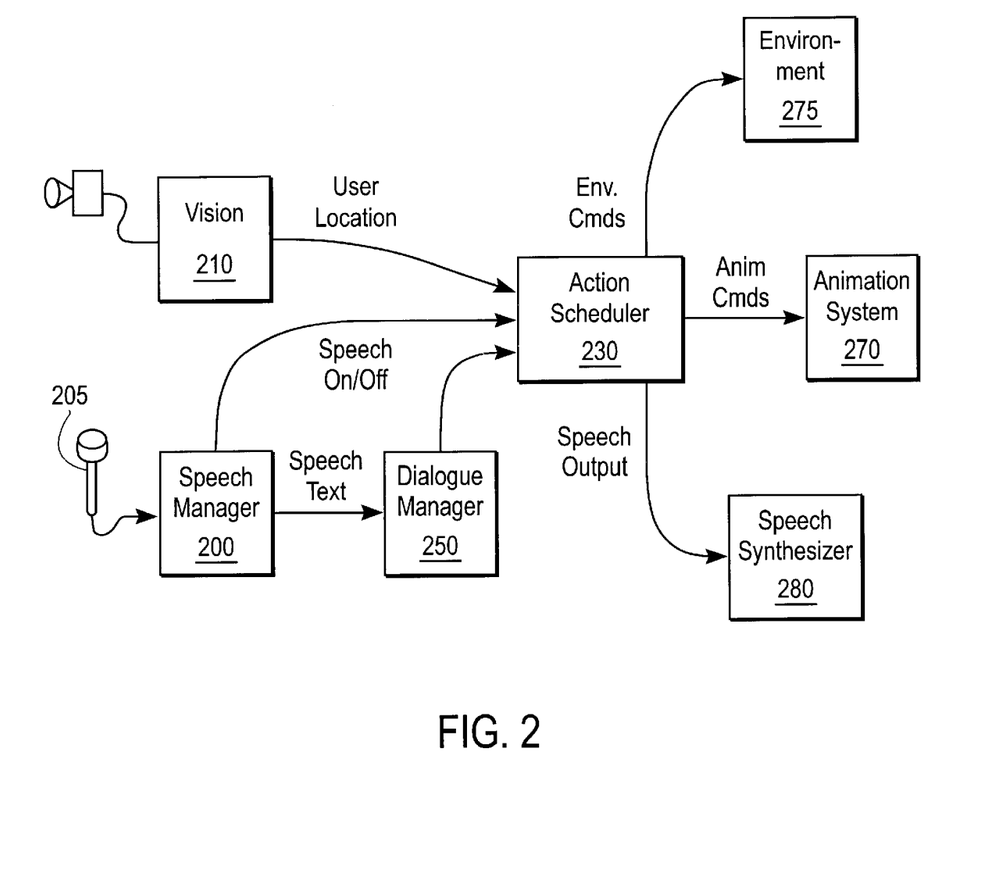
FIG. 2 is a block diagram of a streamline d architecture for an animated character according to the present invention.

Referring again to the drawings, wherein like reference numerals designate identical or corresponding parts, and more particularly to FIG. 2 thereof, there is illustrated a block diagram of a streamlined architecture for an animated character.

The architecture combines functionality of important character interaction and decision-making modules with reduced message passing for efficient decision-making and response for control of the animated character.

The speech manager 200 controls real-world inputs provided to the animated character. The speech manager 200 includes a speech input component 205 and a vision component 210. The speech input component 205 captures speech input from a user of the animated character system. The speech input component 205 may be a microphone, directional microphone, streaming device, or any other mechanism that allows speech to be captured or a device that receives captured speech.

The speech manager 200 recognizes the speech input and provides records or packets of information to each of the action scheduler 230 and dialogue manager 250. Packets provided to the action scheduler 230 comprise a light-weight recognition identifier, referred to as an on/off record. Two examples of on/off records are shown in Table 1 below.

TABLE 1

0000 Header
0100 Body: Speech on
0200 Trailer
0000 Header
0100 Body: Speech detection
0200 Trailer The on/off record includes any necessary communications related or protocol information such as a header and a trailer, and a field indicating that speech has been detected (i.e., speech on or speech detection, for example).

The speech on/off records are important because they are lightweight and provide as near as possible to instantaneous data to the action scheduler 230, indicating that speech is occurring. This allows the action scheduler 230 to prepare a reactive (fast) response to speech directed toward the animated character. The response may be prepared prior to any recognition of exactly what the content or meaning of the speech being directed at the animated character contains.

Other types of inputs, other than speech, may also be recognized and indicated by on/off records similar to that shown in Table 1. For example, motion may be detected, recognition of electronic switch positions on equipment, or any type of input that may be provided to an animated character may be first recognized as an input and identified in a record prior to any processing on exactly what the input is or exactly how it should be responded to in detail.

The speech manager 200 also provides coordinates for where the speech is coming from to the action scheduler 230. Tables 2A and 2B illustrate example records or packets that provide information as to the origin of speech or other input directed toward the animated character. In Table 2A in addition to normal communications-type protocols (header/trailer) the location, speech at coord is provided, in this example at location x=50, y=153.2 and z=5. These coordinates would translate to an origin having some bearing to a position of the animated character (for example, directions x, y, and z from a midpoint of a computer screen displaying the animated character) Other points with reference to the speech or other input being provided may also be used (e.g. x, y, z from a center of a conference room).

TABLE 2A

0000 Header
0100 Speech at coord (50, 153.2, 5);
0200 Trailer

TABLE 2B

Information Record (
Type: Speech origination;
Distance: 8;
Direction: 175;
Elevation: 5.9;
);

Table 2B illustrates another example of an information record that may be passed indicating a location or origin of the speech. In this example, the record is identified by type (in this example being speech origination), and a distance, direction, and elevation, relating to an alt-azimuth coordinate system.

The coordinates (location information) may be determined by a vision device 210 that identifies movements associated with an incoming speech stream. Other devices that locate an origin of an input stream may also be utilized, directional microphones or user pushbuttons associated with preset locations, for example. Again, although speech is primarily envisioned, the locations of other types of inputs may also be provided (e.g. location of motion).

The location information is also provided to the action scheduler 230, which, in combination with the speech on record or packet/indicators discussed above, allows the action scheduler to determine an appropriate first reaction to speech or input being applied to the animated character. (For example, when a user enters the room and says "Hello, Will", the speech manager 200 would immediately send a speech on signal to the action scheduler, and a set of coordinates indicating a location of the user, so that a recognition nod or other gesture may be applied toward the location of the user. As mentioned above, this recognition would be accomplished without an analysis of the content of a communication provided by the user that initiated the speech on signal. Such instantaneous reactions (reactive or fast responses) mirror those that are common among interactions between human beings, and therefore provide a more comfortable and usable animated character as a user interface.

In addition to recognition and speech on/off/coordinate commands, the speech manager also provides a content packet to the dialogue manager 250. The content packet or record is a more data-intensive message than the location information or speech on records sent to the action scheduler. The content packet is intended to convey the content of a communication from a user to the animated character and provide that content to the dialogue manager for analysis for appropriate detailed responses.

The content records/packets may contain an entire input from the user (for example, an entire phrase spoken by the user, "Hello, Will"). Alternatively, any input by a user may be broken into subpackets, each subpacket containing part of a full input (for example, two packets, a first containing "Hello", and a second packet containing "Will"). A division of a phrase or other input into subpackets may be determined based on a time period or a recognition by the speech manager of logical subcomponents within a particular phrase. For example, if the speech recognizer recognizes a noun or an adverb, rules of grammar may tell the speech manager or indicated to the speech manager that parts of a phrase should be connected to others in an attempt to keep them in a single record.

The location information may also be utilized to help determine content of the speech. For example, if a user is asking questions and is standing near light switches or other equipment, the user's location may help determine what the questions are directed toward (i.e., light switches of other equipment).

Table 3 shows two examples of a content record that may be utilized by the present invention. Each content record indicates an input type (speech in this example), the first record also having a data field where a file is identified containing the speech content, and a recognition I.D. which points to an originating location or other data relevant to the speech. The second record identifies a port I.D. in which streaming data is provided to the dialogue manager, the dialogue manager being responsible for connecting to that port to receive the stream data, and a recognition I.D. which indicates a direction from which or an origin of the input, or other data associated with the input.

TABLE 3

Content Record (
    Type: Speech
    Data: Speech_File.dat
    Recognition_ID: A1257
);
Content Record (
    Type: Speech;
    Port_ID: Port_4;
    Recognition_ID: A4572
);

The dialogue manager utilizes the speech content record and any data provided from the speech manager to determine an appropriate response to the input. Appropriate responses may include any of operations to be performed on equipment associated with the animated character (conference rooming equipment, such as lighting, sound level, operation of podium features, for example), and actions to be performed by the animated character, including pointing toward items walking in certain directions, performing other actions, and any speaking that may need to be done by the animated character while interacting with the user. In addition, any facial expressions and/or gestures that would necessarily need to be included with content in order to more effectively communicate with the user are also determined by the dialogue manager. These types of facial expressions and gestures are dependent on what is being said but are not necessarily conveying content themselves. For example, a facial expression that normally occurs at the end of asking a question would be included with a question that is an appropriate response of the animated character to an input by a user. The dialogue manager would also assure that response occurred at the end of the question where it is normally expected when interacting with a human instead of at any other position of the question such as the beginning or middle. An example of an expression that goes along at the end of a question would be a gesture where the eyebrows get raised ("raising of the eyebrows"). For example, if a user asks the animated character "Would you adjust the lighting in the conference room please", the animated character might decide that an appropriate response is "Is this a proper adjustment?" and raising the eyebrows of the animated character during the "justment" of the word "adjustment". These types of non-verbal behaviors are contained in a rule set that is invoked by dialogue manager, the rule set takes into account general things that can be said about how people interact, the types of things known in modern psychology, researched and published.

An appropriate response determined by the dialogue manager is then placed in a response packet that includes content, any speech (for example, motions, or other actions to be taken by the conversation character), any gestures or facial expressions that need to be included with that content, and any timing cues or constraints required when performing or outputting the content and/or expressions.

Table 4 includes an example of a packet of content and content-related gestures and facial expressions. The packet includes any normal communication protocol-related items, and storage for the content, gestures, and facial expressions, and timing to be associated with those gestures. A format of the content may be specifically tailored to an animation system 270, which might include formats for any of speech synthesizers currently available, including Microsoft products. The facial expressions and gestures are related to reactions but they are the type that need to be timed with actual speech, like raising your eyebrows when you ask a question, so the timing is identified in the record in relation to the content—basically conveying that this is what I have to say (content), and put this particular gesture or facial expression in at this point of the content.

TABLE 4

An example of a string marked up with gesture, face and other information:

"\\Mrk=406\\ A blast ripped through a Moscow \\Mrk=306\\ apartment building today, killing \\Mrk=100\\ dozens of people in what authorities are calling a \\Mrk=100\\ terror attack."

where...
406 is trigger for a new graphic image;
306 is a trigger for an iconic gesture representing a container (in this case a building); and
100 is a trigger for the eyebrows to be raised.

The action scheduler also provides a packet of reaction type movements or gestures, that are, however, non-speech related. Table 5 provides an example of a reaction type packet provided to the animation system 270 from the action scheduler 230. In the record, a specific gesture or facial expression is identified (which may have a location on a file, in a database, or provided in the packet itself).

Figure 3:
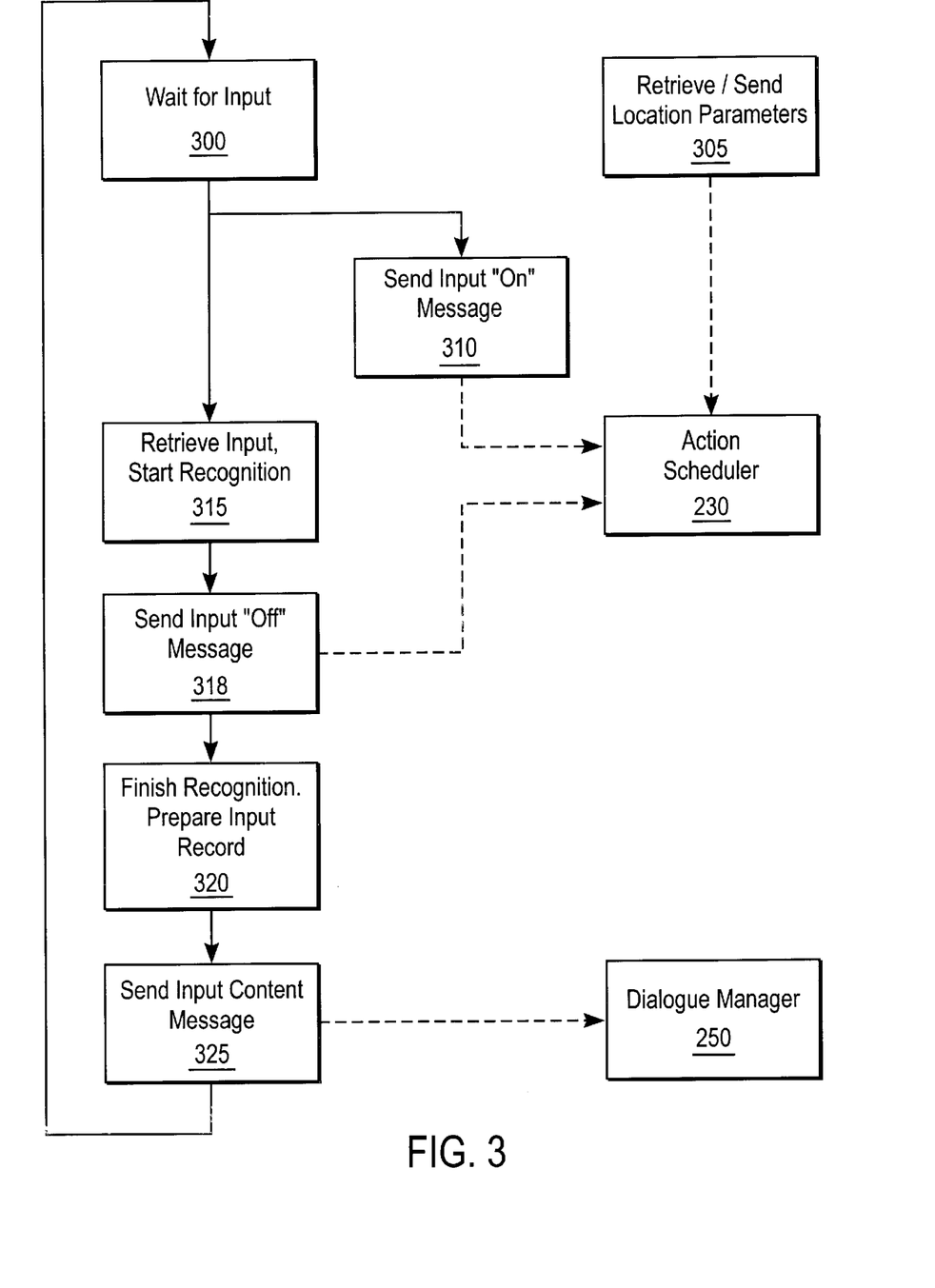
FIG. 3 is a flow chart of one embodiment of processes performed by a speech manager.

TABLE 5 begin animation sequence
    Action Type: Head nod;
    Direction: 05,23,45; (x,y,z)
    Extras: wink
end;

FIG. 3 is a flow chart of one embodiment of processes performed by a speech manager according to the present invention. At step 300, the speech manager is in a wait state until an input from a user via a connected device or other input mechanism is provided. The inputs might be speech, motions, or gestures of a user, communications across an communications line (Internet, or TCP/IP packet, for example), or input from a directly connected device (e.g., keyboard, mouse, controller, or other mechanism). At step 305, location parameters of inputs received by the input manager are determined. Steps 300 and 305 are shown as separate parallel processes, as would be performed by independent devices (speech input 205 and vision device 210, for example). Alternatively, sequential processes may be utilized.

At step 310, the input message on is sent to the action scheduler 240. Along with the speech on message, or independently, the input location is also provided to the action scheduler.

At step 315, the entire input record (speech content, for example) is retrieved, and an input record is prepared (step 320). At step 325 the prepared input record is sent to the dialog manager 250 to determine appropriate response(s) for the animated character, if any.

Figure 4A:
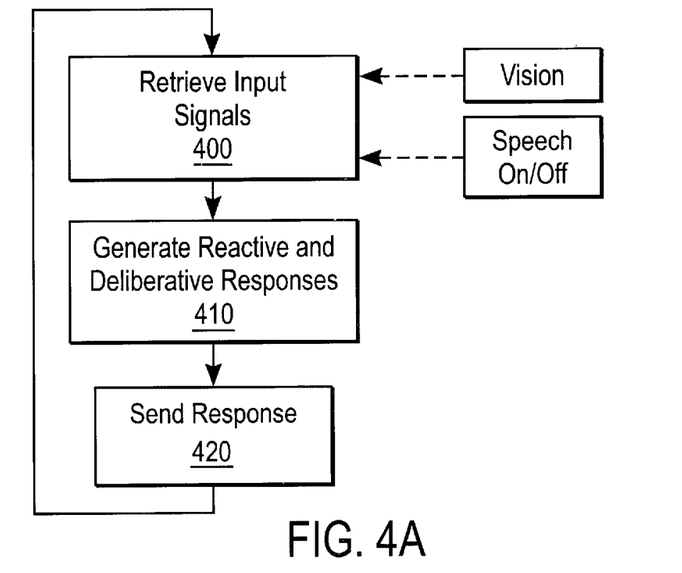
FIG. 4 is a flow chart of one embodiment of processes performed by a action scheduler.
Figure 4B:
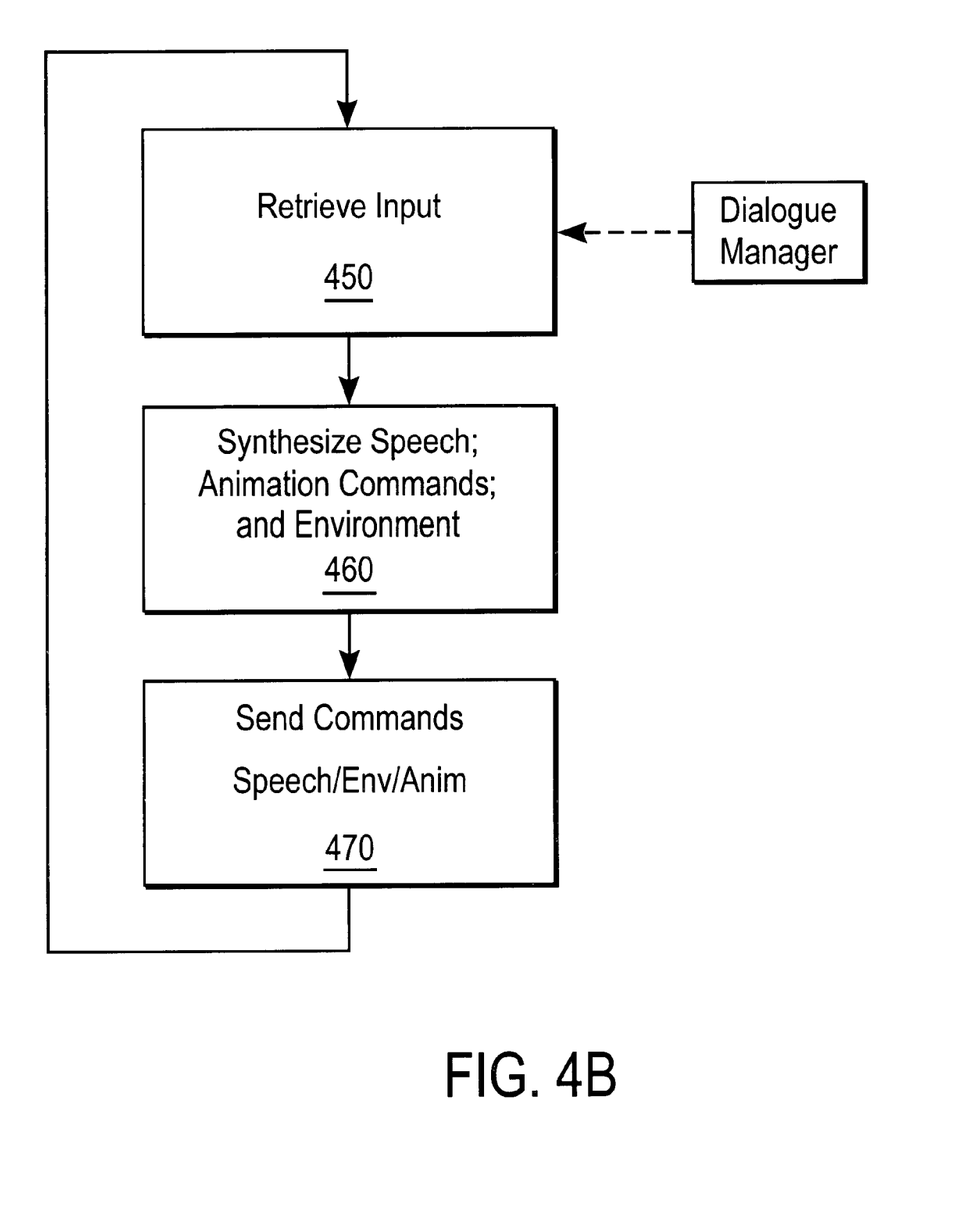

FIG. 4A is a flow chart of one embodiment of processes performed by the action scheduler. The basic process is retrieving any input signals (Speech on and/or location) (step 400), generating a reactive response appropriate for the input (step 410), and sending the response to an animation system to implement the response (step 420). FIG. 4B is an example of a process also performed by the action scheduler based on input records (content) received from the dialogue manager (step 450, receive inputs). At step 460, speech according to the inputs is sent to a speech synthesizer for synthesis, animation commands (via escape sequences, for example, see Table 4 ) are sent to the animation system, and environment commands, which may also be embedded in escape sequences within the input record, are sent to an environment control device or directly to an environment device 275 that is to be operated by the environment command(s). The action scheduler prioritizes and coordinates playing of responses on the animated character, including scheduling between messages received at a same time or requested at a same time from each of the speech manager 200 (speech on/off reactions) and dialog manager 250 (deliberative responses, speech gestures, etc.).

Figure 5:
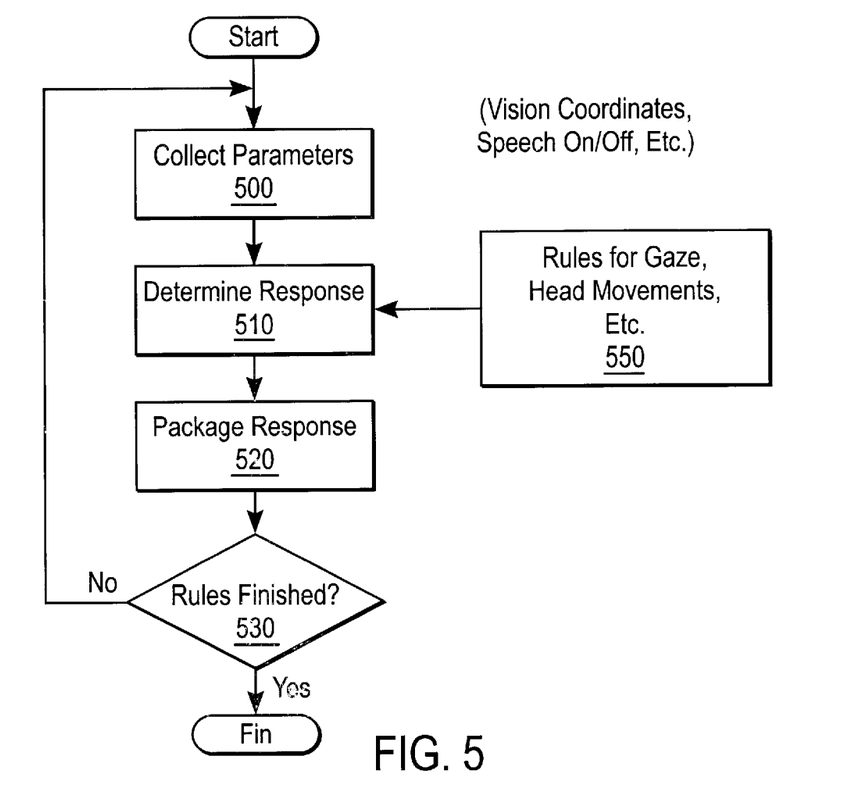
FIG. 5 is a flow chart of one embodiment of a process to generate a reactive response to an input.

FIG. 5 is a flow chart of one embodiment of a process to generate a reactive response to an input (e.g., an input captured by the speech manager). At step 500, parameters are collected or determined from the input information. In step 510, the parameters are utilized to determine an appropriate reactive response. In one embodiment, the parameters are utilized to fire a rule based system that identifies the re active response. For example, parameters of a user located within 3 feet of the animated character, and a first speech on signal emanating as a result of this user would fire a rule resulting in a recognitional nod by the animated character in a direction of the user.

At step 520, the response is packed in a format for communication to the animation system 270. Any format or communications protocol may be utilized. At step 530, if additional reactions are needed, the process repeats. The entire process in each of FIGS. 4 and 5 repeat with new inputs received from the user(s).

Figure 6:
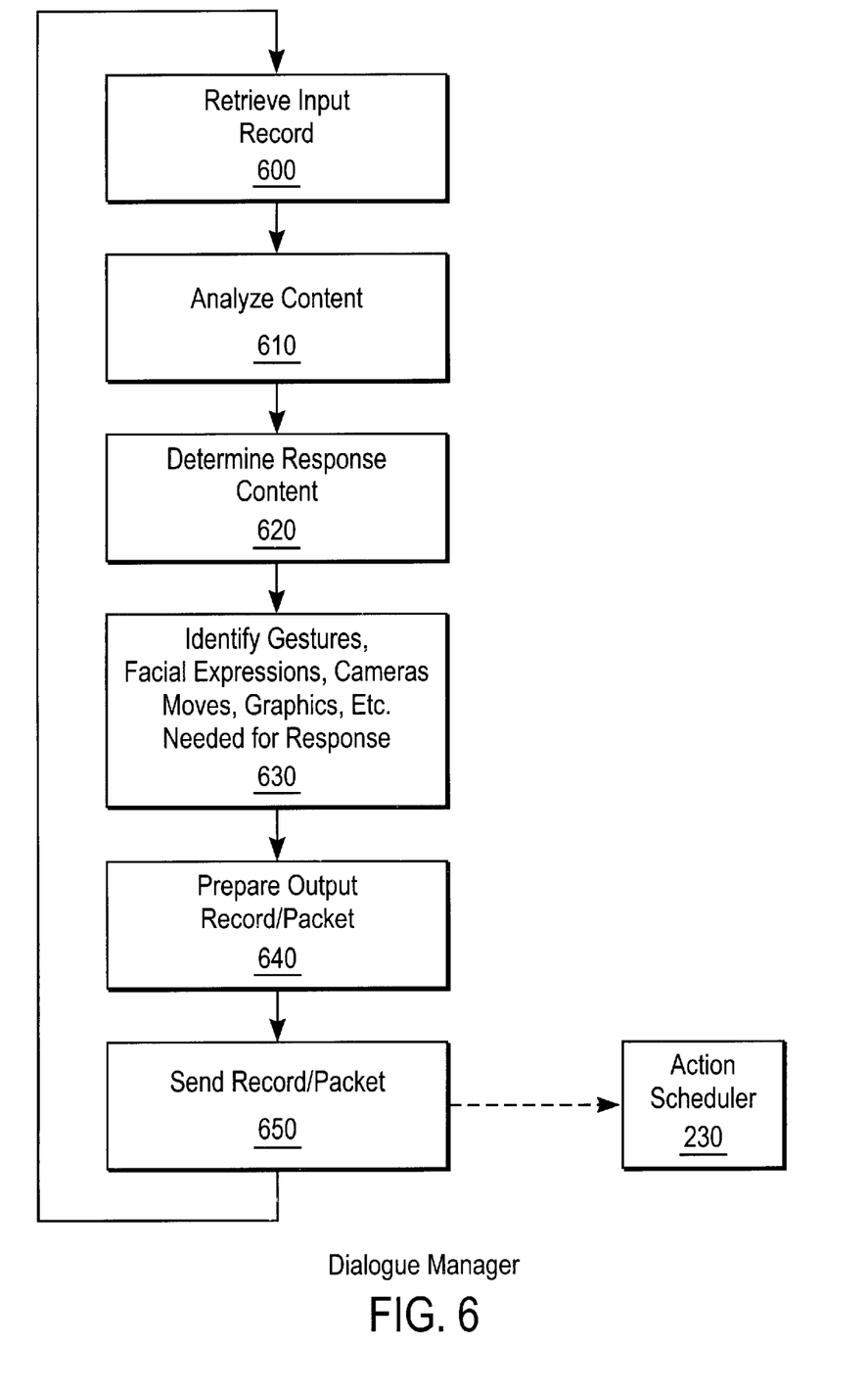
FIG. 6 is a flow chart of one embodiment of processes performed by a dialog manager.

FIG. 6 is a flow chart of one embodiment of processes performed by a dialog manager (e.g., manager 250). At step 600, an input record is retrieved (a record containing content, e.g. a text representation of speech, as illustrated in the examples of Table 3 ). At step 610 the content is analyzed, and a response to the content is determined (step 620). At step 630, any gestures needed to be included with the content are identified, and, at step 640, the content and gestures are prepared into a record or packet for communication to the action scheduler 230. At step 650, the record/packet is communicated.

The animation system 270 controls actions gestures, and other movements of the animated character. In one embodiment, the actions identified in packets received by the packet manager include identifiers to stored gestures (stored in a gesture database accessible to the animation system), and other pre-programmed or scripted actions also stored in an animation system accessible location (e.g. database, memory, etc.). The animation system recalls the motions based on type and identifier or other database retrieval techniques and plays the scripted action.

In one embodiment, the gesture and action databases have a set of generic body movement descriptions which are relativized to related body parts of the animated character. In this manner any scripted, preprogrammed action or gestures may be applied to any of people, animal, or cartoon based animated characters.

One example of a gesture database is described in Prevost, U.S. patent application Ser. No. 09/405,683, filed on the same day as the present application, entitled "Method and Apparatus for Performance Animation Gesture Capture and Playback on an Animated Character," which is incorporated herein by reference, in it's entirety.

Figure 7:
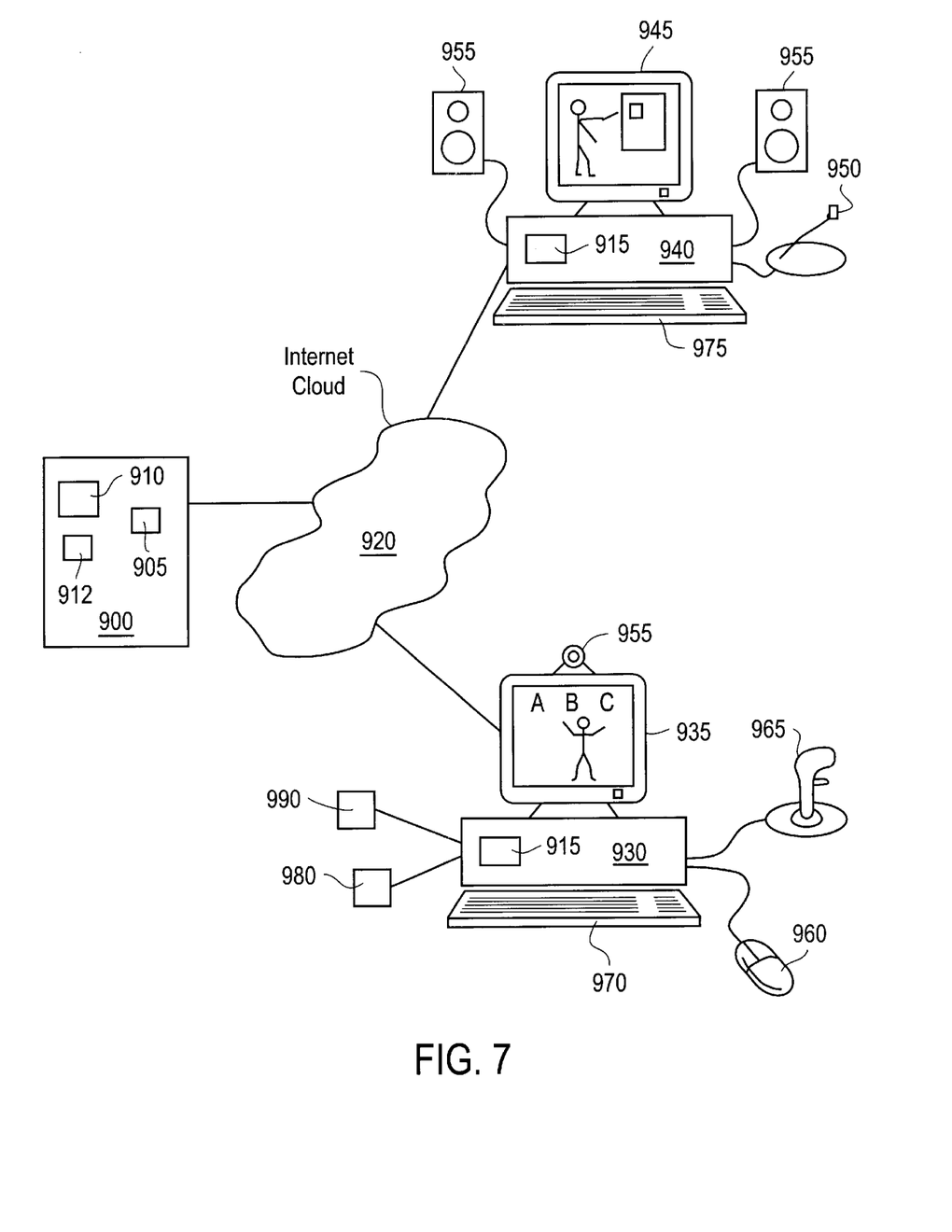
FIG. 7 is a flow chart of one embodiment of an animation system.

FIG. 7 illustrates an Internet embodiment of the present invention. A host server 900, connected to the Internet 920, hosts a web page 905 that identifies a link to an animated character site. A user of any computer connected to the Internet (computers 930 and 940, for example) may access the animated character site.

Linking to the animated character site invokes a configuration that allows the connected computer to interact with an animated character program 910 on the host server 900. Via Internet related communications, inputs from user devices (microphone 950, joystick 965, mouse 970, camera 955, or keyboards 970 and 975, for example, are provided to the animated character program 910. The animated character program transmits character motions, speech and other sounds, and control signals that are displayed on computer monitors 935 and 945, speakers 955, and devices 980 and 990, respectively, for example. Each of computers 930 and 940 and their respective displays are interacting independently of each other (carrying on different interaction with a same or different animated character, on a same or different topic).

In an alternative example embodiment, upon link activation, the host server 900 transfers an additional program 912 (e.g., applet, cookie, or other Internet browser compatible. The applet is transferred to the linking computer and performs functions associated according to the speech manager of the present invention (identifying and packaging into messages inputs from any connected devices of the linking computer, and sending them to the main program (animated character program) 910 which performs the functions of the action scheduler and dialog manager, and animation system, sending result signals that translate to character actions to the linking computer system. The applet program may also include a module for the animation system which may be configured according to (in order to control) the devices attached to the user's computer.

In yet another alternative all programming of the present invention is downloaded to the user's computer while all data intensive stores (e.g., databases (gestures, etc.), and rule based systems) are maintained at the host server 900 with communications between the user's computer and host server performing interrogatories and responses to the databases. As will be appreciated by those skilled in the art, many different divisions of responsibilities (i.e., which components of the present invention execute on the server 900 or user computers 930 and 940) may be determined in light of the present disclosure.

Many other network or communications configurations may also be utilized to practice the present invention, in particular, any of a distributed system, over a network (e.g., LAN, WAN), Internet, or Web Based applications. For example, referring now to FIG. 8, in one embodiment, a network 1000 is illustrated having computers 1000a . . . 1000c connected thereto. Processes (e.g., any of the software modules discussed above) of the present invention may be distributed among the networked computers 1000a . . . 1000c, thereby sharing computation workload of the present invention. For example, software modules performing speech management and action scheduler processes may be hosted on networked computer 1000b, dialog manager processes performed on networked computer 1000c, and networked computer 1000a performs all functions of the animation system 270.

Figure 8:
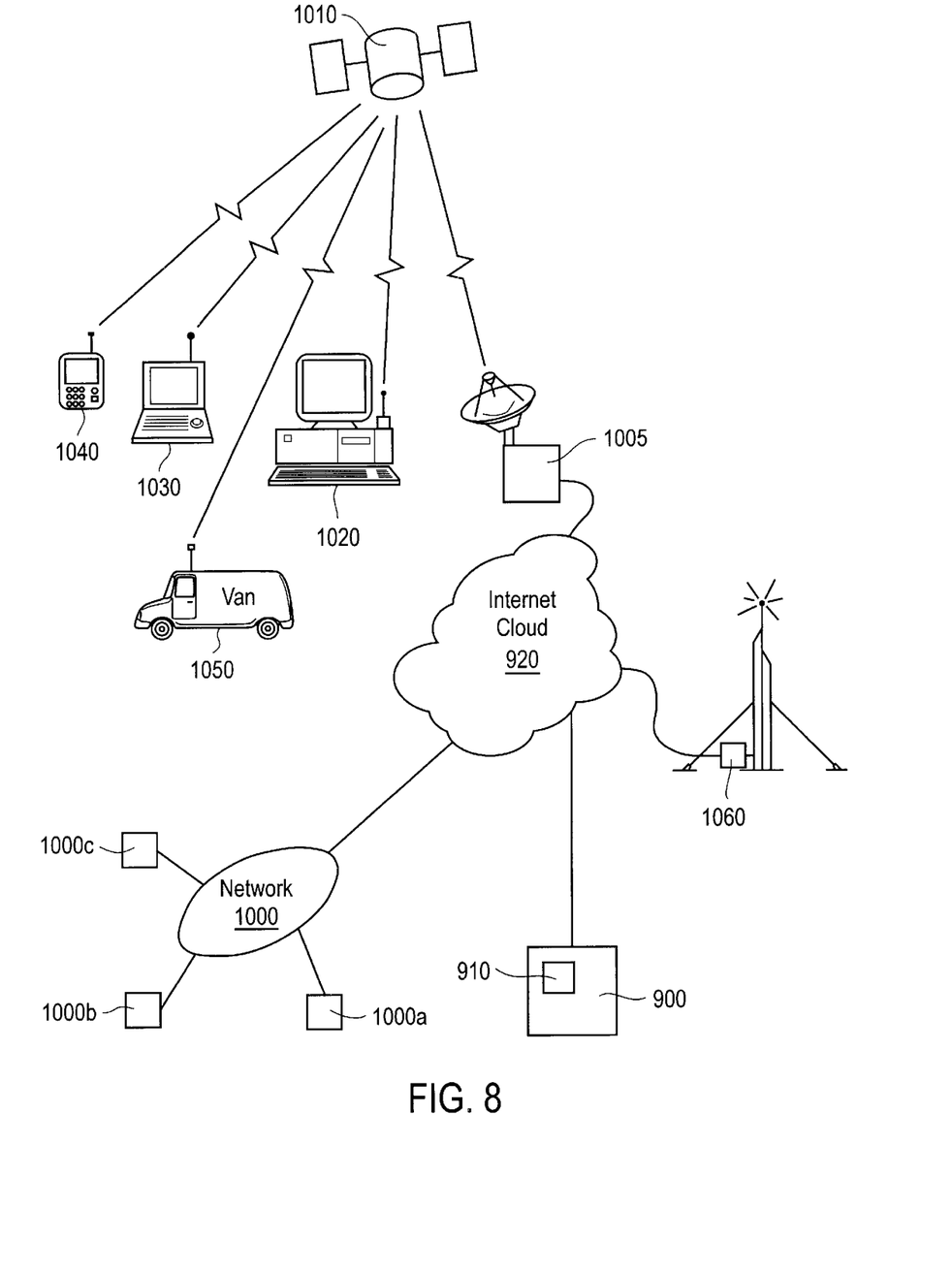
FIG. 8 is a block diagram of components utilized in one embodiment of an animation system for implementing an animation according to reaction and dialog manager modules according to the present invention.

Whether distributed across a network or performed on a single host server (e.g. 900), results or processes of the present invention may be shared with both local and remotely connected computers, including desktop computers 1020, notebook computers 1030, palm sized or hand held computers 1040, or any computers installed in either vehicles 1050 or other locations. Transmission or distribution of these results or processes may be via any of direct connections, wired and wireless transmissions including radio 1060 and satellite 1010 communications mediums.

Sharing processes of the present invention include user requests that are responded to by the server sending applets, cookies or other Internet programs (Java code, for example) that are run on the locally or remotely connected computers. Each applet or other Internet program contains code that performs any one or more of the processes of the present invention. This arrangement also distributes portions of the computational load of the present invention to the requesting computer.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, optical discs, DVD, CD-ROMs, microdrive, and magneto-optical disks, ROMS, RAMs, EPROMS, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, uploading applets containing processes of the present invention, communications between modules of the present invention, whether between modules hosted on a same computing device or remotely located devices, identifying inputs to an animated character of the present invention, packaging inputs and input identifications into records, processing reactive and detailed responses, playing of reactive and detailed responses via movements, speech and actions of the animated character, and controlling electronic and other equipment based on information (inputs) processed by the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An apparatus for implementing an autonomous animated character, comprising:

an animation system configured to control said animated character based on commands;

an action scheduler configured to, receive inputs related to at least one of said animated character and a user of said animated character, and send commands based on said inputs to said animation system to control said animated character;

a vision mechanism configured to send a location of said user to said action scheduler as one part of said inputs;

a dialogue manager configured to, receive speech input records and determine speech, actions, and gesture responses to be performed by said animated character, and provide said speech, actions, and gesture responses to said action scheduler as a second part of said inputs; and a speech manager configured to, receive speech inputs from said user, prepare and send a speech on message to said action scheduler indicating speech inputs are being received, and convert the received speech to a speech input record and send the speech input record to said dialogue manager.

2. The apparatus according to claim 1, wherein:

said speech on message is prepared immediately upon receipt of said speech inputs; and said speech on message comprises a lightweight message only indicating that speech is being received.

3. The apparatus according to claim 2, wherein said speech manager further comprises a directional microphone for determining that the speech being received is directed toward said animated character.

4. The apparatus according to claim 1, wherein:

said vision mechanism updates a memory device with said user location, said memory device accessible by said action scheduler; and said action scheduler utilizing the location stored in said memory device to determine an appropriate direction in 3D space of gestures to be commanded of said animated character.

5. The apparatus according to claim 1, wherein:

said speech manager prepares the speech input message sent to said action scheduler by performing a speech recognition, converting the recognized speech to text, and placing the recognized speech converted to text in the speech input message.

6. The apparatus according to claim 5, wherein:

said dialogue manager performs deliberative processing based on said speech input record to determine said speech, actions, and gesture responses to be performed by said animated character.

7. The apparatus according to claim 6, wherein said speech, actions, and gesture responses sent to said action scheduler are formatted in a text markup language.

8. The apparatus according to claim 1, wherein said action scheduler further comprises a reactive processing mechanism configured to determine reactive responses to user speech identified by said speech on message.

9. The apparatus according to claim 1, wherein:

said speech manager is further configured to prepare and send a speech off message to said action scheduler indicating that said speech inputs have ceased; and said action manager utilizes said speech off message to at least one of terminate a current gesture and determine a reactive response to the cessation of speech from said user.

10. The apparatus according to claim 8, wherein:

said action scheduler is further configured to perform scheduling between each of said reactive responses and said speech, actions, and gesture responses determined by said dialogue manager; and present commands in said scheduled order or simultaneously to said animation system implementing each of said deliberative responses and said speech, actions, and gesture responses.

11. The apparatus according to claim 8, wherein said reactive responses are prepared in parallel with said deliberative responses prepared by said dialogue manager, and are scheduled and presented to said animation system in said commands in one of tandem and with of a priority given to said reactive responses.

12. The apparatus according to claim 8, wherein said action scheduler utilizes a rule based system for determining said reactive responses to be performed by said animated character.

13. The apparatus according to claim 12, wherein said reactive responses determined by said rule based system includes gestures of all types, including any of introductory, recognition, and turntaking gestures to be performed during conversation between said animated character and said user.

14. The apparatus according to claim 5, wherein:

processing of said speech manager and said vision system are embodied in at least one first computer program intended to run on a first network connected computer;

said animation system is embodied in a second computer program intended to run on said first network connected computer; and each of said action scheduler and said dialog manager are embodied in at least one third computer program intended to run on a second network connected computer.

15. The apparatus according to claim 14, wherein:

said first and second network connected computers are Internet connected computers;

said speech manager and said vision system are Internet browser compatible applets;

said animation system is an Internet browser compatible applet; and said second network connected computer is configured to host an Internet server configured to upload said speech manager vision system, and said animation system applets to Internet connected requesting computers, and execute said action scheduler and dialog manager computer program(s).

16. The apparatus according to claim 15, wherein:

one of said Internet connected computers is said first network connected computer, and said user inputs are received from devices connected to said first network connected computer and directed to said first computer program.

17. A method of controlling an animated character, comprising the steps of:

identifying occurrence of an input to said animated character;

preparing a lightweight record identifying said input occurrence;

transferring said lightweight record to an action scheduler;

preparing a reactive response for said animated character in response to the input occurrence identified in said lightweight record; and transferring said reactive response to an animation system that controls said animated character; and playing said reactive response by said animation system.

18. The method according to claim 17, wherein said step of preparing a lightweight record comprises the step of:

preparing only an indication of a type of the input that has occurred in said lightweight record.

19. The method according to claim 18, wherein said type of input indication is an indication of at least one of a start and a stop of speech, motion, or other inputs received from input devices.

20. The method according to claim 17, wherein said lightweight record indicates one of a start and a stop of speech inputs directed at said animated character.

21. The method according to claim 17, further comprising the steps of:

preparing a content record of said input occurrence identifying the substance (content) of said input occurrence;

transferring said content record to a dialog manager;

preparing a detailed response based on said content record;

transferring said detailed response to said animation system; and playing said detailed response.

22. The method according to claim 21, wherein said step of preparing a content record comprises the steps of:

recognizing speech directed toward said animated character, converting said recognized speech to text, and placing the recognized text in said content record.

23. The method according to claim 22, wherein said step of preparing a detailed response comprises the steps of:

performing deliberative processing based on said content record to determine appropriate speech, gesture, and action responses to said input occurrence; and preparing said detailed response record identifying each of the speech, gestures, and actions determined appropriate by said deliberative processing.

24. The method according to claim 23, wherein said detailed response record comprises a markup text string where text indicates speech and escape sequences indicate any of gestures, actions, and environment commands to be played on said animation system.

25. The method according to claim 21, wherein:

said step of transferring said detailed response comprises the steps of, transferring said detailed response to said action scheduler, scheduling said detailed response along with reactive responses for play on said animation system, and transferring each of said detailed and reactive responses to said animation system according to said schedule.

26. A method comprising the steps of:

receiving an animated character request at a host computer from a remote computer;

uploading an animation system and a speech manager from said host computer to said remote computer;

receiving lightweight and content records from said speech manager on said remote computer;

preparing fast and detailed responses based on said lightweight and content records; and uploading said fast and detailed responses to said animation system on said remote computer.

27. The method according to claim 26, wherein:

said remote computer is connected to said host computer via an Internet connection;

said animation system and said speech manager are each contained in one of an Internet browser compatible applet or other Internet transferrable program;

said uploading of said speech manager and said animation system applets is performed by a server program on said host computer in response to an http request from an Internet compatible browser on said remote computer;

said lightweight and content records are received by said server program via Internet protocol communications sent by said speech manager applet; and said uploading said fast and detailed responses is performed via Internet protocol communication between said server program and said animation system applet.

* * * * *